US012780226B2

(12) United States Patent
Hollowell et al.

(10) Patent No.: US 12,780,226 B2
(45) Date of Patent: Nov. 3, 2026

(54) AUTOMATIC BRAKE CONTROL TO SUPPORT PROPULSION SYSTEM IN ELECTRIC VEHICLE

(71) Applicant: FCA US LLC, Auburn Hills, MI (US)

(72) Inventors: James R Hollowell, Auburn Hills, MI (US); Zachary C Rogalski, Auburn Hills, MI (US); Michael E Ericson, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 30 days.

(21) Appl. No.: 18/752,844

(22) Filed: Jun. 25, 2024

(65) Prior Publication Data

US 2025/0388221 A1 Dec. 25, 2025

(51) Int. Cl.

*B60W 50/02* (2012.01)
*B60W 10/08* (2006.01)
*B60W 10/18* (2012.01)
*B60W 30/18* (2012.01)

(52) U.S. Cl.

CPC ........ *B60W 50/0225* (2013.01); *B60W 10/08* (2013.01); *B60W 10/182* (2013.01); *B60W 30/18009* (2013.01); *B60W 2510/087* (2013.01); *B60W 2520/10* (2013.01); *B60W 2540/10* (2013.01); *B60W 2710/083* (2013.01); *B60W 2710/18* (2013.01)

(58) Field of Classification Search

CPC ............. B60W 50/0225; B60W 10/08; B60W 10/182; B60W 30/18009; B60W 2510/087; B60W 2520/10; B60W 2540/10; B60W 2710/083; B60W 2710/18; B60W 30/18118; B60W 30/18109; G05D 1/0061; G05D 1/0088; G05D 1/021; G05D 1/0214; G05D 1/0221; G05D 1/0223; B60K 28/00–165

USPC ................................................ 701/22, 70, 84

See application file for complete search history.

(56) References Cited

U.S. PATENT DOCUMENTS

| | | | | |
|---|---|---|---|---|
| 5,343,134 | A * | 8/1994 | Wendt | G01L 5/284 318/362 |
| 6,278,916 | B1 * | 8/2001 | Crombez | B60L 7/26 701/84 |
| 6,679,810 | B1 * | 1/2004 | Boll | F16D 48/068 477/194 |
| 7,926,889 | B2 * | 4/2011 | Bell, Jr. | B60L 50/52 303/191 |
| 8,201,897 | B2 * | 6/2012 | Bell, Jr. | B60L 7/26 303/191 |
| 9,321,355 | B1 * | 4/2016 | Shah | B60L 7/18 |
| 12,330,509 | B2 * | 6/2025 | Harries | B60L 15/2018 |
| 2003/0085576 | A1 * | 5/2003 | Kuang | B60W 30/18063 290/40 C |
| 2003/0221881 | A1 * | 12/2003 | Lee | B60W 30/18118 903/917 |
| 2004/0178754 | A1 * | 9/2004 | Anwar | H02P 3/18 318/362 |
| 2004/0254709 | A1 * | 12/2004 | Kustosch | B60T 17/22 701/70 |

(Continued)

*Primary Examiner* — Manglesh M Patel

(74) *Attorney, Agent, or Firm* — Jeremy J. Klobucar

(57) ABSTRACT

A method of control in a battery electric vehicle includes monitoring an operating parameter of an electric motor in a propulsion system of a vehicle, monitoring a speed of the vehicle, and actuating, by a vehicle controller, a brake of the vehicle when the operating parameter is beyond an operating parameter threshold and the speed is at or below a speed threshold.

13 Claims, 4 Drawing Sheets

(56) References Cited

U.S. PATENT DOCUMENTS

2005/0017580 A1* 1/2005 Cikanek ................ B60W 20/00 303/191
2005/0211478 A1* 9/2005 Sakuma .................... B60L 7/22 180/65.1
2007/0191181 A1* 8/2007 Burns .............. B60W 30/18118 477/40
2008/0190680 A1* 8/2008 Kaneko ................... B60L 58/20 180/170
2009/0107740 A1* 4/2009 Bell .................... B60L 15/2081 701/22
2011/0172869 A1* 7/2011 Bell, Jr. .............. B60L 15/2081 701/22
2012/0072065 A1* 3/2012 Minamikawa ......... B60K 6/547 903/903
2012/0073922 A1* 3/2012 Kaestner ............. B60W 10/188 303/3
2015/0081150 A1* 3/2015 Wolff .................. B60L 15/2018 903/902
2016/0082969 A1* 3/2016 Jang .......................... B60L 3/12 477/7
2016/0318501 A1* 11/2016 Oldridge ............... B60W 20/12
2018/0043792 A1* 2/2018 Sawada ................... B60L 15/20
2020/0321898 A1* 10/2020 Hellinga ................... H02P 6/06
2020/0377095 A1* 12/2020 Bergin .................. B60W 10/06
2020/0391707 A1* 12/2020 Hollowell ........... F16H 63/3483
2021/0276426 A1* 9/2021 Cote .......................... B60L 7/18
2022/0097707 A1* 3/2022 Semenov .............. B60T 8/3215
2022/0126700 A1* 4/2022 Eitzer ................. B60W 30/188
2022/0227235 A1* 7/2022 Gagas ................... B60L 15/025
2022/0234452 A1* 7/2022 Harries ............... B60L 15/2081
2023/0234589 A1* 7/2023 Kanzaki .............. B60L 15/2054 701/22
2024/0166188 A1* 5/2024 Books ................... B60W 10/08
2025/0162428 A1* 5/2025 Wampler ......... B60W 30/18118

* cited by examiner

AUTOMATIC BRAKE CONTROL TO SUPPORT PROPULSION SYSTEM IN ELECTRIC VEHICLE

FIELD

The present disclosure relates to a control of a brake system and propulsion system in an electric vehicle.

BACKGROUND

In driving electric vehicles, a motor may be actuated by a driver to hold the vehicle on a hill, without use of the vehicle brakes. As current is continually supplied to the motor without movement of the motor, to hold the vehicle still, the temperature of the motor and related components can increase, which can affect the performance and durability of these components. Additionally, a motor or other propulsion system fault can impair the ability of the vehicle to move and there is a need to be able to secure the vehicle in such situations.

SUMMARY

In at least some implementations, a method of control in a battery electric vehicle includes monitoring an operating parameter of an electric motor in a propulsion system of a vehicle, monitoring a speed of the vehicle, and actuating, by a vehicle controller, a brake of the vehicle when the operating parameter is beyond an operating parameter threshold and the speed is at or below a speed threshold.

In at least some implementations, the operating parameter is a temperature of the electric motor and the operating parameter threshold relates to a temperature threshold of the electric motor. In at least some implementations, the speed threshold is met when the vehicle is not moving.

In at least some implementations, the operating parameter threshold is actuation of a throttle input of the electric motor and the speed threshold is met when the vehicle is not moving. In at least some implementations, after the brake is actuated, the method includes reducing by the controller an electrical input to the electric motor to reduce a torque output from the electric motor. In at least some implementations, the torque output from the motor is reduced to zero.

In at least some implementations, the method includes determining when the vehicle is being commanded to move and then releasing the brake to permit vehicle movement. In at least some implementations, releasing the brake is done as a function of a torque output of the motor so that a brake force is further reduced as the torque output is further increased, and the brake is fully released when the torque output exceeds a torque threshold. In at least some implementations, the controller controls one or both of a rate of releasing of the brake and a rate of torque increase from the electric motor to control a vehicle acceleration when the vehicle is commanded to move.

In at least some implementations, a predetermined torque output from the electric motor for a given electrical input is compared to an actual torque from the electric motor in response to the given electrical input to the electric motor, and the operating parameter threshold is met when the actual torque is less than the predetermined torque output by a threshold amount.

In at least some implementations, a method of controlling a vehicle includes determining either: a) that a propulsion system 12 is being actuated to hold a vehicle still; or b) the propulsion system 12 is not capable of moving the vehicle, and applying by a controller of the vehicle a brake system of the vehicle and reducing or terminating actuation of the propulsion system.

In at least some implementations, determining that a propulsion system is being actuated to hold a vehicle still is accomplished by comparison of a throttle input actuation and a vehicle speed. In at least some implementations, the method also includes detecting an inclination of the vehicle.

In at least some implementations, reducing or terminating actuation of the propulsion system is accomplished by the controller reducing or termination a supply of electricity to an electric motor of the propulsion system without regard to whether a throttle input of the vehicle is being actuated.

In at least some implementations, determining that the propulsion system is not capable of moving the vehicle is accomplished as a function of either: a) a comparison of the state of actuation of a throttle input and the resulting torque output from the propulsion system; or b) the temperature of a motor of the propulsion system.

In at least some implementations, the brake system is one or both of a normal driving brake system of the vehicle and a parking brake system of the vehicle.

In at least some implementations, the brake system is a normal driving brake system of the vehicle and wherein the method includes determining when a brake force of the normal driving brake system is not sufficient to hold the vehicle still and actuating a parking brake system of the vehicle.

In at least some implementations, the method includes determining when the vehicle is being commanded to move and then releasing the brake to permit vehicle movement. In at least some implementations, releasing the brake is done as a function of a torque output of the motor so that a brake force is further reduced as the torque output is further increased, and the brake is fully released when the torque output exceeds a torque threshold.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
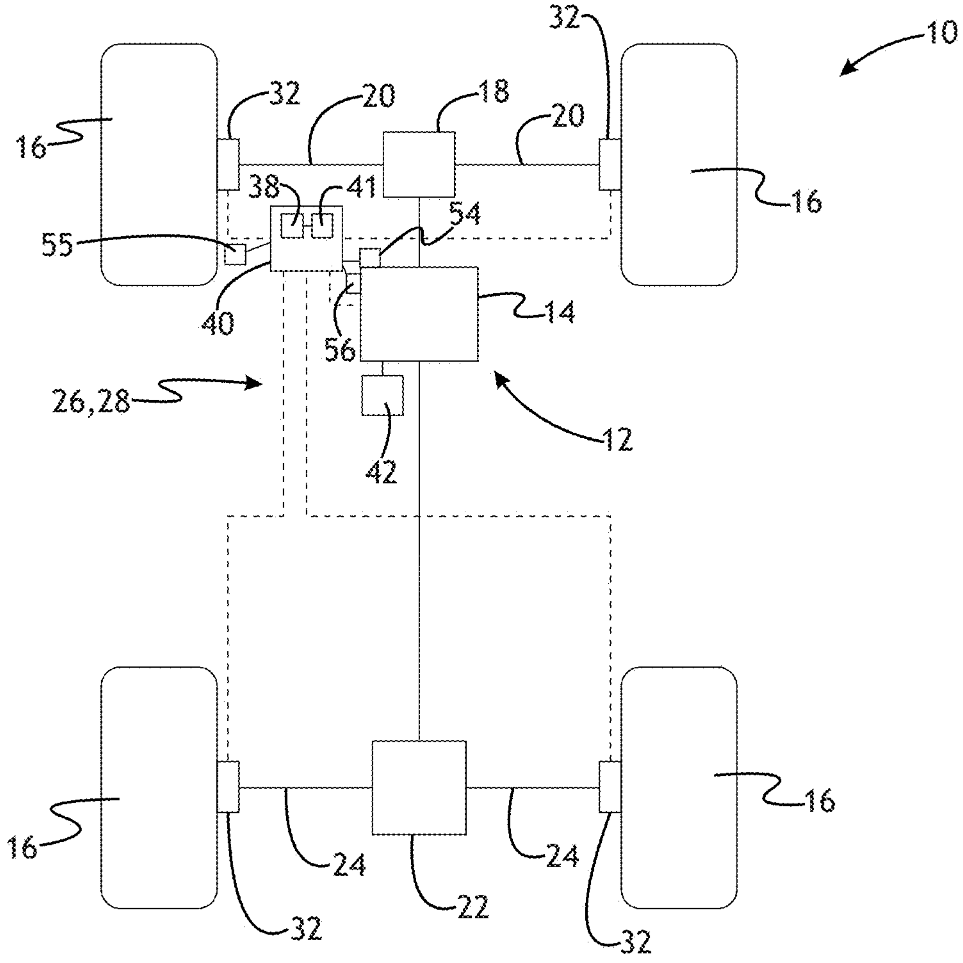
FIG. 1 is a diagrammatic view of a vehicle drivetrain and showing a propulsion system, brake system and control system.

Referring in more detail to the drawings, FIG. 1 illustrates a vehicle drivetrain 10 including a propulsion system 12 with a prime mover 14 coupled to vehicle wheels 16 to drive the wheels 16 and propel the vehicle in forward and reverse directions. The prime mover 14 may include one or more electric motors 14 and the vehicle may be a battery electric vehicle (BEV) wherein all propulsion is provided by the motor(s) 14. For ease of description, the system will be described with regard to a single motor 14 but any number of motors can be used, as desired. The drivetrain 10 may also include other components, like a front differential 18 connected between the motor 14 and the wheels 16 by front side shafts 20, a rear differential 22 connected between the motor 14 and rear wheels 16 by rear side shafts 24. And still further components like a transmission or gearset, if desired, and constant velocity joints and the like to couple together the rotating components in the drivetrain 10.

Further, a brake system 26 is provided and includes a normal driving brake system 28 that is used during operation of the vehicle to slow and stop a moving a vehicle, or hold an operating vehicle stopped, and may also include a parking brake system 30 (FIG. 2) typically used to prevent movement of a parked vehicle that is not being operated. The brake system 26 includes one or more brake assemblies 32, with each brake assembly 32 associated with a separate one of the wheels 16 and arranged to reduce a rotary speed of the wheel and hence, the vehicle. The brake assemblies 32 may be of any desired design. For example, the brake assemblies 32 might include hydraulically actuated drum or disc brakes. The brake assemblies 32 may be actuated by user actuation of a brake input 34, often in the form of a brake pedal that is depressed by the foot of a user. The brake input 34 may be directly mechanically linked or coupled to the brake assemblies 32 or the brake system 26 may be a so-called brake-by-wire system in which the brake input 34 is electrically but not directly mechanically coupled to the brake assemblies 32. In this type of a system, actuation of the brake input 34 causes a signal to be sent to a brake actuator that is then driven to drive the brake assemblies 32 and create a braking force on one or more wheels 16.

Via the parking brake system 30, one or more brake assemblies 32 can be actuated independently of the driving brake system 26. The parking brake system 30 may include a user actuated parking brake input 36, which may be a switch or the like by which an electric parking brake mechanism is actuated to engage or disengage a parking brake. In other systems, the parking brake input 36 may be a lever that is actuated by hand or foot and coupled to a parking brake by a suitable cable.

Figure 2:
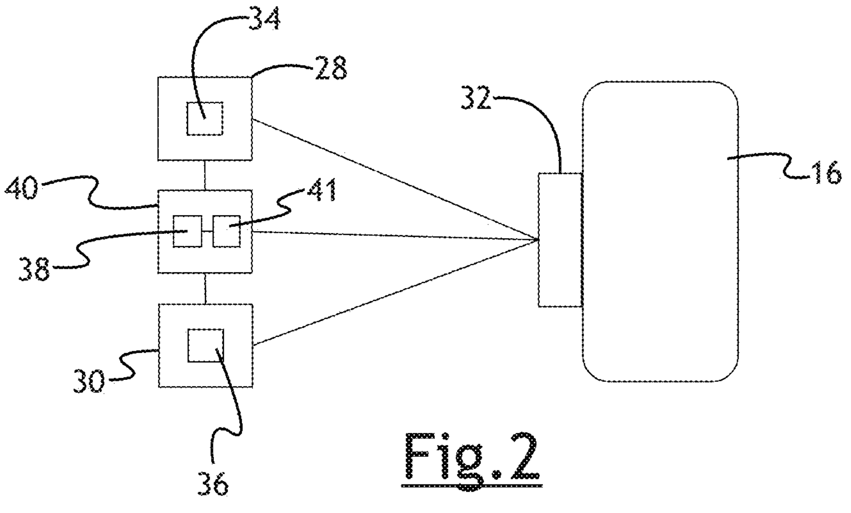
FIG. 2 is a diagrammatic view of a vehicle brake system and related controller.

In the schematic diagram of FIG. 2, a single brake assembly 32 is shown. The brake assembly 32 is coupled to and may be actuated by one or more of a user actuated driving brake input 34, a user actuated parking brake input 36 and a controller 38 which may be part of a vehicle control system 40 of the vehicle. In at least some implementations, at least one brake assembly 32 is actuatable by the controller 38 without actuation of the driving brake input 34 or parking brake input 36. In this way, the control system 40 can apply a braking force to one or more wheels 16 of the vehicle, without requiring a driver or user of the vehicle to actuate a brake input 34, 36.

In order to perform the functions and desired processing set forth herein, as well as the computations therefore, the control system 40 may include, but is not limited to, one or more controller(s), processor(s), computer(s), DSP(s), memory, storage, register(s), timing, interrupt(s), communication interface(s), and input/output signal interfaces, and the like, referred to be reference numeral 38 in FIGS. 1 and 2, as well as combinations comprising at least one of the foregoing. For example, the control system 40 may include input signal processing and filtering to enable accurate sampling and conversion or acquisitions of such signals from communications interfaces and sensors. As used herein the terms control system 40 may refer to one or more processing circuits such as an application specific integrated circuit (ASIC), an electronic circuit, a processor (shared, dedicated, or group) and memory 41 that executes one or more software or firmware programs, a combinational logic circuit, and/or other suitable components that provide the described functionality. The control system 40 may be distributed among different vehicle modules, such as an infotainment control module, engine control module or unit, powertrain control module, transmission control module, and the like, if desired.

The term "memory" or "storage" as used herein can include volatile memory and/or non-volatile memory, generally referred to by reference numeral 41 in FIGS. 1 and 2. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

Control system 40 actuation of the brake assembly 32 may be desirable in different situations. For example, if the vehicle is at a standstill on an incline (hill of increasing slope in the direction of current orientation or travel of the vehicle), a driver may use torque from the motor 14 to hold the vehicle from moving forward. That is, the driver may actuate a throttle input 42 (e.g. accelerator pedal or the like) to command the motor 14 to provide torque sufficient to hold the vehicle in position on the hill. In this situation, energy is provided to the motor 14 but the motor 14 is not rotating the wheels (or is not rotating them by any appreciable amount where slight rocking of the wheels to generally maintain the position of the vehicle may occur), and the motor 14 temperature can increase as can the temperature of other propulsion system components (e.g. solenoids, batteries, inverter or other components that may become heated in use of the propulsion system 12). This temperature increase can negatively affect operation of the motor 14 or other propulsion system component and in some implementations may cause an overheat protection scheme to be employed to prevent the motor 14 or other component(s) from exceeding a maximum temperature threshold. The overheat protection scheme may reduce the output potential of the motor 14 or terminate operation of the motor 14.

To prevent the motor 14 temperature from getting too high, the control system 40 may actuate one or more brake assemblies 32 so that the brake assembly 32 or assemblies resist vehicle motion and may hold the vehicle still, if desired. This enables a reduction or termination of power to the motor 14 to reduce or terminate motor 14 operation and permit the motor 14 and other propulsion system components to cool, or at least prevent these components from undue further heating. In at least some implementations, this may be done without notice to the driver. That is, this may be done even though the driver is still actuating the throttle input 42 and seeking to command the motor 14 to provide torque and hold the vehicle in position on the hill. The control system 40/controller 38 may thus ignore or reduce the driver's throttle input 42 command and apply the brakes to hold the vehicle and permit the propulsion system components to cool or prevent undesired further heating thereof.

While the systems and method so far described can help to prevent over or undue heating of the motor 14 and other components, when the driver intends to move the vehicle forward, the brakes (e.g. brake assembly or assemblies) 32 must be released and driver control over the throttle/propulsion system 12 restored. Because the driver might still be actuating the throttle input 42, simply having the controller 38 fully and quickly release the brake(s) 32 and restore throttle control to the driver may result in an undesirable acceleration event or lurching of the vehicle. To reduce or prevent this affect, the controller 38 may gradually release the brake(s) 32 as the motor 14 torque output increases so that the combination of the brake(s) 32 and motor 14 take the vehicle gradually from a standstill to movement. With the vehicle still on the hill, the system is arranged to control a handoff between the brakes 32 holding the vehicle, to the brakes 32 and motor 14 holding the vehicle still, to the motor 14 holding and then moving the vehicle up the hill. That is, there is a mesh or blend of the braking force and motor 14 torque as the brakes 32 are decreased and the motor 14 torque increased to provide a smoother, less abrupt acceleration, and reduce the likelihood that the driver will know that the brake system 26 was actuated and the motor 14 output damped or terminated.

The rate at which the brakes 32 are released may be a function of the rate at which the driver actuates the throttle input 42. For example, the brakes 32 can be released more quickly when the throttle input 42 is actuated more rapidly to avoid a braking force that fights the vehicle acceleration such that when the brakes 32 are released an abrupt acceleration occurs. The opposite is also true in which the brakes 32 may be released more slowly if the throttle input 42 is actuated slowly to avoid a release of braking force before sufficient torque is commanded from the motor 14 to at least hold the vehicle still and begin acceleration. As used herein, the term "brakes" generally refers to the braking system 26 including one or more braking assemblies, as noted herein, and multiple brake assemblies need not be involved despite use of the plural term brakes.

Additionally or instead, the controller 38 can adjust the throttle commands to provide the appropriate blend with the release of the braking force. For example, if the driver actuates the throttle input 42 too rapidly, the actual output from the motor 14 can be damped or downwardly adjusted by the controller 38 to provide a smoother brake release and acceleration event. The opposite may also be true where the motor 14 output is increased relative to the driver command from the throttle input 42 to enable the brakes 32 to be released sooner while at least holding or provide a slow rate of acceleration so that the throttle can thereafter control vehicle movement.

While described above with regard to holding a vehicle still on an incline, the systems and methods may be utilized in other instances. For example, the brakes 32 may be applied by the controller 38 when the motor 14 or other drivetrain component has a fault that prevents or severely inhibits vehicle movement. Application of the brakes 32 here may prevent the vehicle from rolling, or could prevent the vehicle from being operated when such operation may cause damage or put a failing component in further distress.

The application of brakes 32 may utilize the normal driving brake system 26 and may be applied to any or all wheels 16, as desired. Further, the application of brakes 32 may utilize the parking brake system 30 in addition to or instead of the normal driving brake system 26. In at least some implementations, the parking brake system 30 is used if there is a failure of the driving brake system 26, or when application of the driving brake system 26 is not sufficient to hold the vehicle still (for example, when the driving brake system 26 is compromised, perhaps overheated or has a decrease in system pressure).

Figure 3:
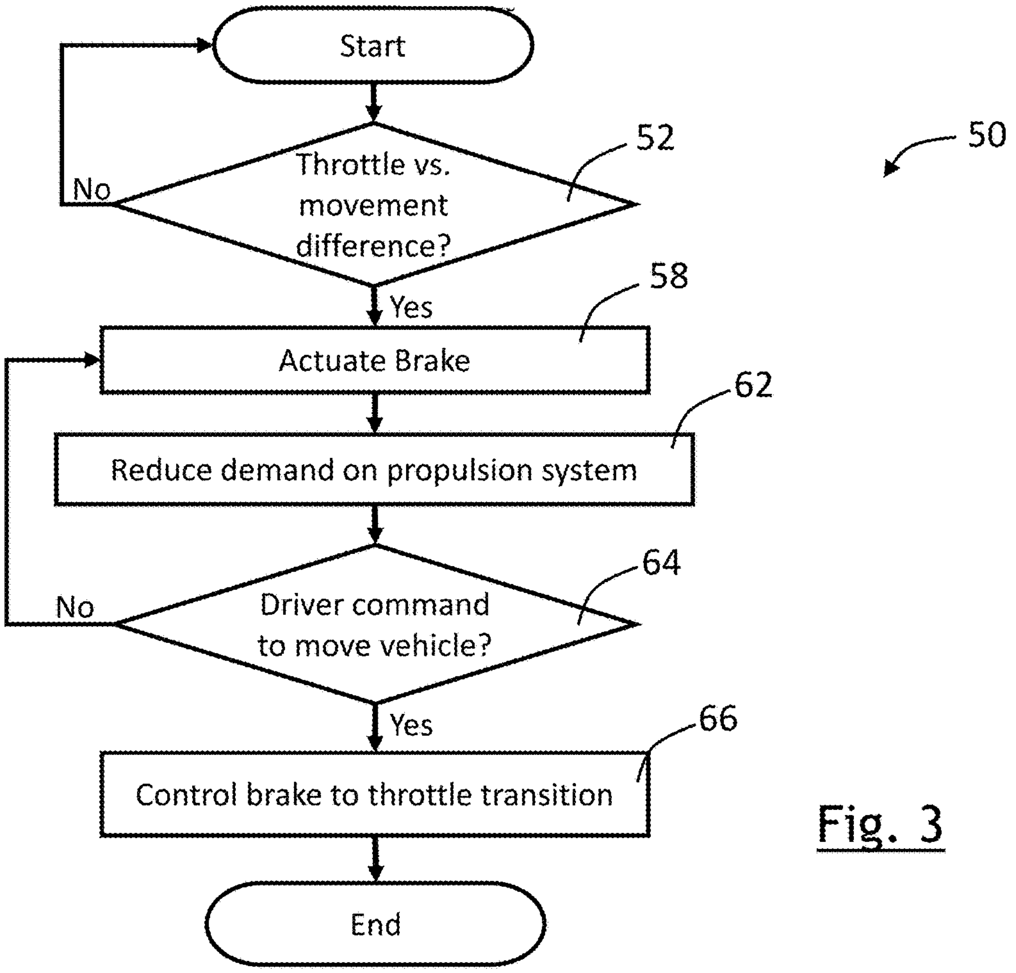
FIG. 3 is a flowchart of a method for controlling application and release of a vehicle brake.

FIG. 3 illustrates a method 50 of controlling the vehicle that utilizes an automated control of at least one brake assembly 32 and a corresponding reduction in motor 14 output, as noted herein. This method may begin at step 52 by determining if there is a throttle input 42 being actuated by a driver without corresponding movement of the vehicle as determined, for example, by a vehicle speed sensor 55 (FIG. 1) with regard to a speed threshold which may require no movement of the vehicle, in some implementations. In this step, the corresponding movement can be no movement of the vehicle (i.e. the vehicle is stopped). This can indicate either a propulsion system 12 fault or that the vehicle is being held on an incline by use of motor 14 torque from the propulsion system 12. That the vehicle is being held on a hill can be determined, for example, by comparison of the throttle actuation and vehicle speed as determined by a vehicle speed sensor 54 (FIG. 1), and/or by a sensor responsive to the inclination of the vehicle, such as an accelerometer 56 (FIG. 1). A propulsion system 12 fault can be determined, for example, by comparison of a predetermined torque output from the electric motor 14 (e.g. a mapped torque response) for a given electrical input (e.g. current draw of the motor 14) to an actual torque from the electric motor 14 in response to the given electrical input to the electric motor 14. In such a system, the operating parameter threshold needed to continue in the method is met when the actual output torque is less than the predetermined torque output by a threshold amount. The fault may indicate, for example, that the propulsion system 12 is not capable of propelling the vehicle, in which case application of the brake in step 58 provides control of the vehicle against inadvertent movement.

When the determination of step 52 is affirmative, the method continues to step 58 in which the controller 38 actuates the vehicle brakes 32 (e.g. one or more brake assemblies 32) so that the vehicle is held against movement at least in part by a brake system 26 to reduce or terminate the load on the motor 14. In at least some implementations, the brakes 32 are applied without regard to the temperature of the motor 14 or other component. In some implementations, the brakes 32 are applied only when the temperature of a motor 14 or other propulsion system 12 component is greater than a temperature threshold as determined by one or more temperature sensors 60 (FIG. 1), to prevent an undesirably high temperature condition or overheating of the motor 14. This may permit, for example, holding the vehicle on a hill with the propulsion system 12 for a limited duration, but prevent undue heating of the motor 14. Further, as noted herein, a high temperature condition within the propulsion system 12 can be a fault that causes a reduction or termination of propulsion system 12 operation, which can cause the brakes 32 to be applied without regard to the torque capability of the propulsion system 12 at that time. Of course, the brakes 32 may be applied regardless of motor 14 temperature or other propulsion system 12 component temperature, if desired. This may enable energy savings and temperature reduction of one or more vehicle components.

Figure 4:
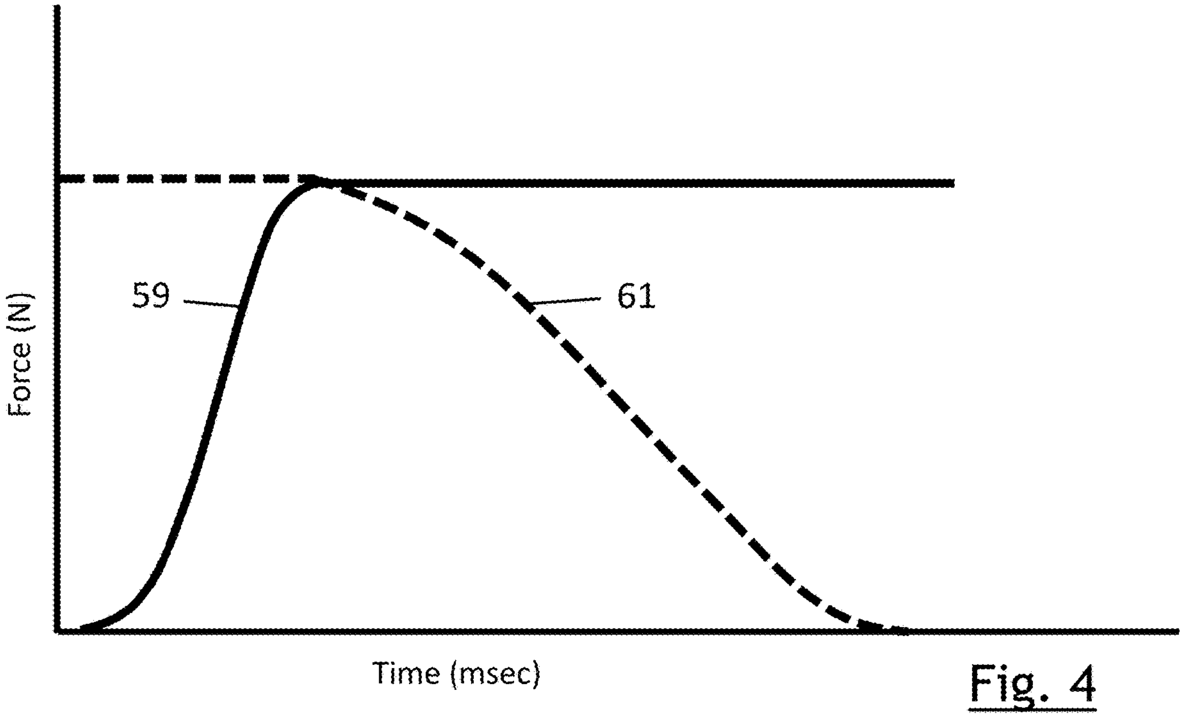
FIG. 4 is a graph showing plots of braking force and motor torque during application of the vehicle brakes and deactivation of the electric motor.
Figure 5:
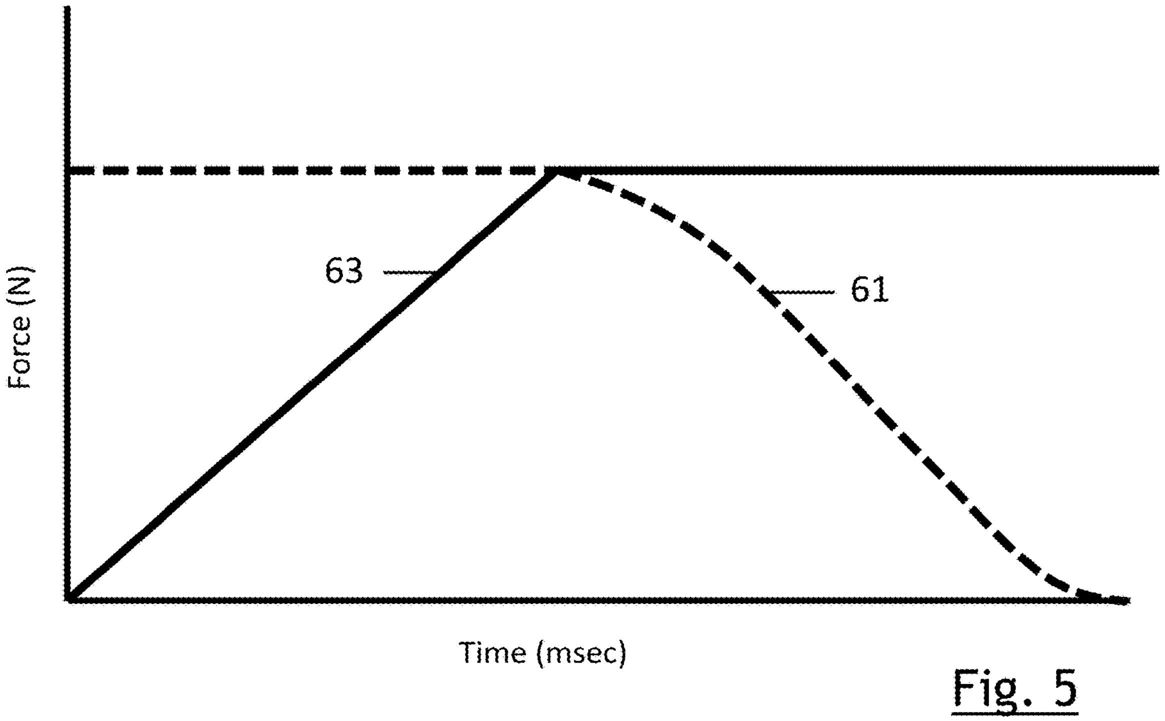
FIG. 5 is a graph showing plots of braking force and motor torque during application of the vehicle parking brake and deactivation of the electric motor.

FIG. 4 illustrates one example implementation of the method in which the braking force is shown by line 59 and the motor output torque is shown by dashed line 61, and in FIG. 5, the braking force is provided by the parking brake system 30 and is shown in line 63. As shown, the braking force increase and motor torque decrease can be blended so that the combination of the forces may, at all times, be sufficient to hold the vehicle still. In this example, when the braking force is sufficient, the motor torque may be reduced, and ultimately, the motor torque may be reduced all the way to zero when sufficient braking force is being applied, in at least some implementations. Of course, other implementations may be used, including but not limited to an implementation wherein the motor torque is maintained until full braking force is provided.

With the brakes 32 applied, the method may continue to step 62 in which the demand on the motor 14 can be reduced or terminated, and this can be done automatically by the controller 38 which may reduce or terminate the electrical input to the electric motor 14 to reduce a torque output from the electric motor 14. That is, this can be done even when the driver continues to actuate the throttle input 42 in which case the output from the throttle input 42 is interrupted in whole or in part, and corresponding control of the propulsion system 12 is assumed by the controller 38.

Next, in step 64, it is determined if the vehicle is being commanded, which may be determined as a function of additional actuation of the throttle input 42. When this is determined, the method continues to step 66 in which the brakes 32 are released to permit vehicle movement. Releasing the brakes 32 may be done in a manner and at a rate set by the controller 38, which may occur as a function of a torque output of the motor 14. In this way, the brake force can be further reduced as the torque output is further increased, and the brakes 32 are fully released when the torque output exceeds a torque threshold.

In at least some implementations, in step 66 the controller 38 controls not only releasing the brakes 32, but also a rate of torque increase from the electric motor 14 to control a vehicle acceleration when the vehicle is commanded to move. As noted above, this can achieve a smoother transition or handoff between the brake system 26 holding the vehicle and the motor 14 propelling the vehicle. In this way, the driver's actuation of the throttle input 42 does not immediately result in direct control by the driver of the motor 14, and that direct control is later phased in, as desired, for improved driving dynamics.

Figure 6:
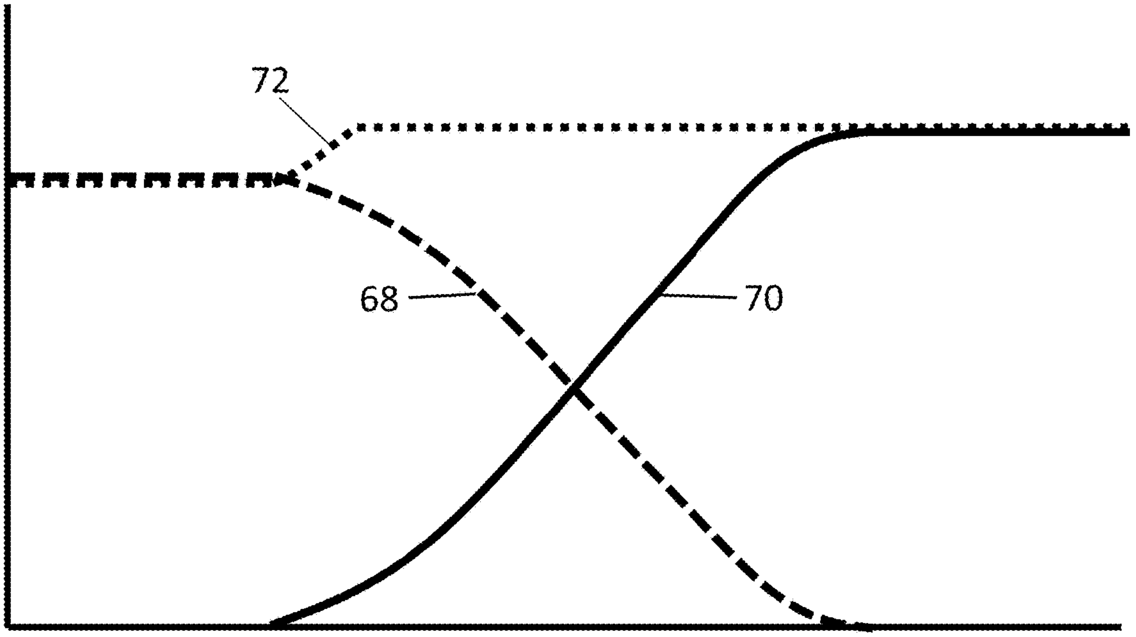
FIG. 6 is a graph showing plots of braking force and motor torque during release of the vehicle brakes and activation of the electric motor to enable vehicle movement.
Figure 7:
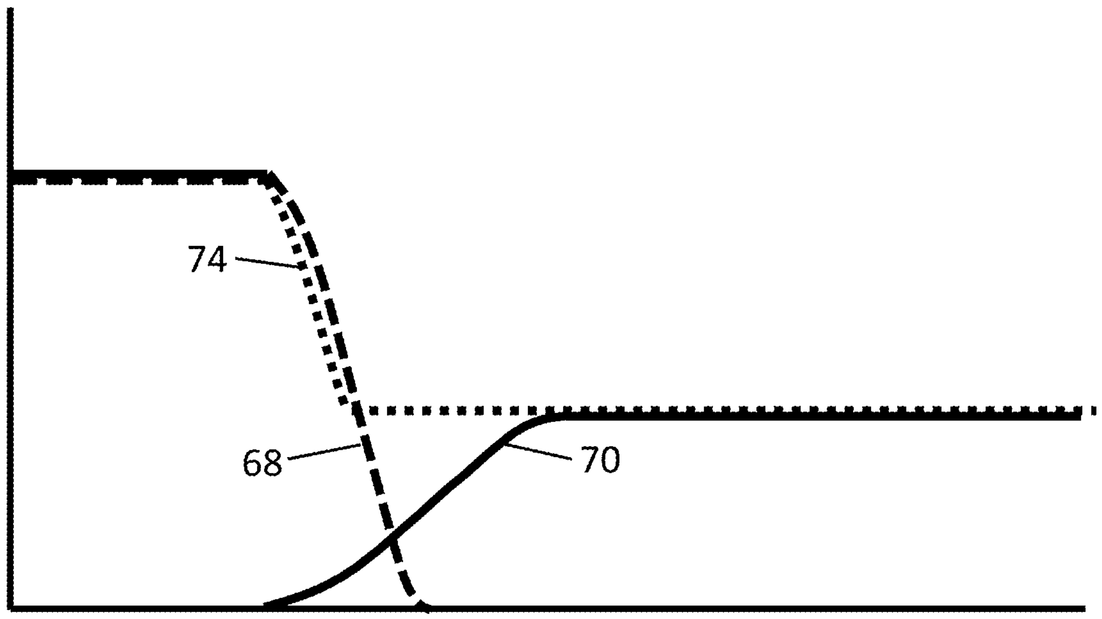
FIG. 7 is a graph showing plots of braking force and motor torque during release of the throttle and vehicle brakes.

FIG. 6 illustrates one example implementation of the method during release of the brake 32 and reactivation of the motor 14, in which the braking force is shown by dashed line 68, the motor output torque is shown by line 70 and a target torque is shown generally by dotted line 72. As shown, the braking force decrease and motor torque increase can be blended so that the combination of the forces may, at all times, be sufficient to hold the vehicle still and then transition to a force that permits vehicle movement as driven by the motor 14. Of course, other implementations may be used, including but not limited to an implementation wherein the braking force is full released before sufficient motor torque is developed to cause vehicle motion. Finally, FIG. 7 illustrates one example implementation when brake force is reduced and released as the throttle is lifted or released, where the braking force is shown by dashed line 68, the throttle curve is shown by line 70 and the target throttle or torque is shown by dotted line 74. In this situation, the brakes will quickly release allowing the vehicle to roll backwards (as the vehicle would if motor torque was reduced on an uphill grade). In this case there is no balanced brake/motor torque blendout like there is when the driver increases throttle.

The systems and methods permit seamless (to a driver) control of the vehicle brake system 26 and propulsion system 12 that may, among other things, reduce energy consumption when a brake system 26 can hold the vehicle in place rather than the propulsion system 12, can reduce wear and heating and permit cooling of propulsion system 12 components in at least some circumstances which may increase performance and/or the lifespan thereof, can prevent inadvertent vehicle movement when such movement is not desired or when the propulsion system 12 is not able to provide torque sufficient to move the vehicle, and can improve the driving dynamics upon initial motion of the vehicle from a standstill.

What is claimed is:

1. A method of control in a battery electric vehicle, comprising:

monitoring an operating parameter of an electric motor in a propulsion system of a vehicle;

monitoring a speed of the vehicle;

actuating by a vehicle controller a brake of the vehicle when the operating parameter is beyond an operating parameter threshold and the speed is at or below a speed threshold, and wherein the operating parameter threshold is actuation of a throttle input of the electric motor and the speed threshold is met when the vehicle is not moving; and determining when the vehicle is being commanded to move and then releasing the brake to permit vehicle movement, wherein the brake is not part of the propulsion system, and wherein the controller controls one or both of a rate of releasing of the brake and a rate of torque increase from the electric motor to control a vehicle acceleration when the vehicle is commanded to move.

2. The method of claim 1 wherein the operating parameter is a temperature of the electric motor and the operating parameter threshold relates to a temperature threshold of the electric motor.

3. The method of claim 2 wherein the speed threshold is a vehicle speed of zero mph.

4. The method of claim 1 wherein, after the brake is actuated, the method includes reducing by the controller an electrical input to the electric motor to reduce a torque output from the electric motor.

5. The method of claim 4 wherein the torque output from the motor is reduced to zero.

6. The method of claim 1 wherein releasing the brake is done as a function of a torque output of the motor so that a brake force is further reduced as the torque output is further increased, and the brake is fully released when the torque output exceeds a torque threshold.

7. The method of claim 1 wherein a predetermined torque output from the electric motor for a given electrical input is compared to an actual torque from the electric motor in response to the given electrical input to the electric motor, and the operating parameter threshold is met when the actual torque is less than the predetermined torque output by a threshold amount.

8. A method of controlling a vehicle, comprising:

determining either: a) that a propulsion system is being actuated to hold a vehicle still; or b) the propulsion system is not capable of moving the vehicle; and applying by a controller of the vehicle a brake system of the vehicle and reducing or terminating actuation of the propulsion system;

determining when the vehicle is being commanded to move and then releasing the brake to permit vehicle movement, wherein releasing the brake is done as a function of a torque output of the motor so that a brake force is further reduced as the torque output is further increased, and the brake is fully released when the torque output exceeds a torque threshold, and where the brake system is or is part of either: 1) a driving brake system that is used during operation of the vehicle to slow and stop a moving vehicle or to hold an operating vehicle stopped; or 2) a park brake system used to prevent movement of a parked vehicle that is not being operated.

9. The method of claim 8 wherein determining that a propulsion system is being actuated to hold a vehicle still is accomplished by comparison of a throttle input actuation and a vehicle speed.

10. The method of claim 9 which also includes detecting an inclination of the vehicle.

11. The method of claim 8 wherein reducing or terminating actuation of the propulsion system is accomplished by the controller reducing or terminating a supply of electricity to an electric motor of the propulsion system without regard to whether a throttle input of the vehicle is being actuated.

12. The method of claim 8 wherein the brake system is one or both of a normal driving brake system of the vehicle and a parking brake system of the vehicle.

13. The method of claim 8 wherein the brake system is a normal driving brake system of the vehicle and wherein the method includes determining when a brake force of the normal driving brake system is not sufficient to hold the vehicle still and actuating a parking brake system of the vehicle.

* * * * *